March 13, 1945. T. G. WALKER 2,371,273
COMBINATION SWEEP RAKE, STACKER, AND LOADER
Filed Aug. 19, 1943 5 Sheets-Sheet 3

Thomas G. Walker,
INVENTOR.

BY
Victor J. Evans & Co.
ATTORNEYS

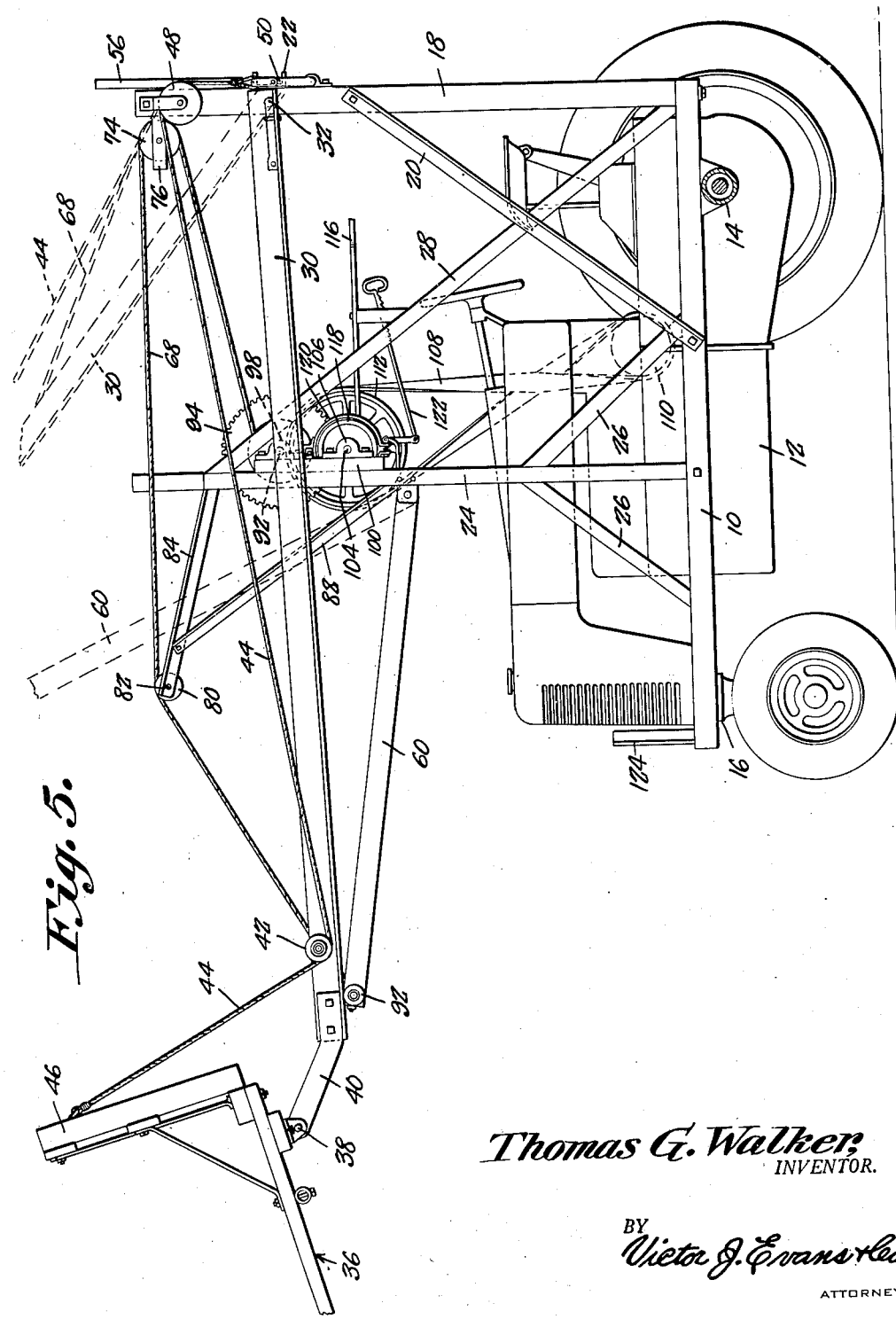

Patented Mar. 13, 1945

2,371,273

UNITED STATES PATENT OFFICE 2,371,273

COMBINATION SWEEP RAKE, STACKER, AND LOADER

Thomas G. Walker, Nishnabotna, Mo., assignor of one-sixth to Joyce R. Bailey, one-sixth to George W. Boettner, and one-sixth to George I. Beasing, all of Rockport, Mo.

Application August 19, 1943, Serial No. 499,263

3 Claims. (Cl. 214—140)

My invention relates to agricultural devices, and has among its objects and advantages the provision of an improved combination sweep rake, stacker and loader adapted to be mounted on a tractor and so devised as to be capable of lifting relatively heavy loads to an exceptionally high elevation, and in which the device is designed so as to embody exceptionally durable and good balance.

Figure 1:
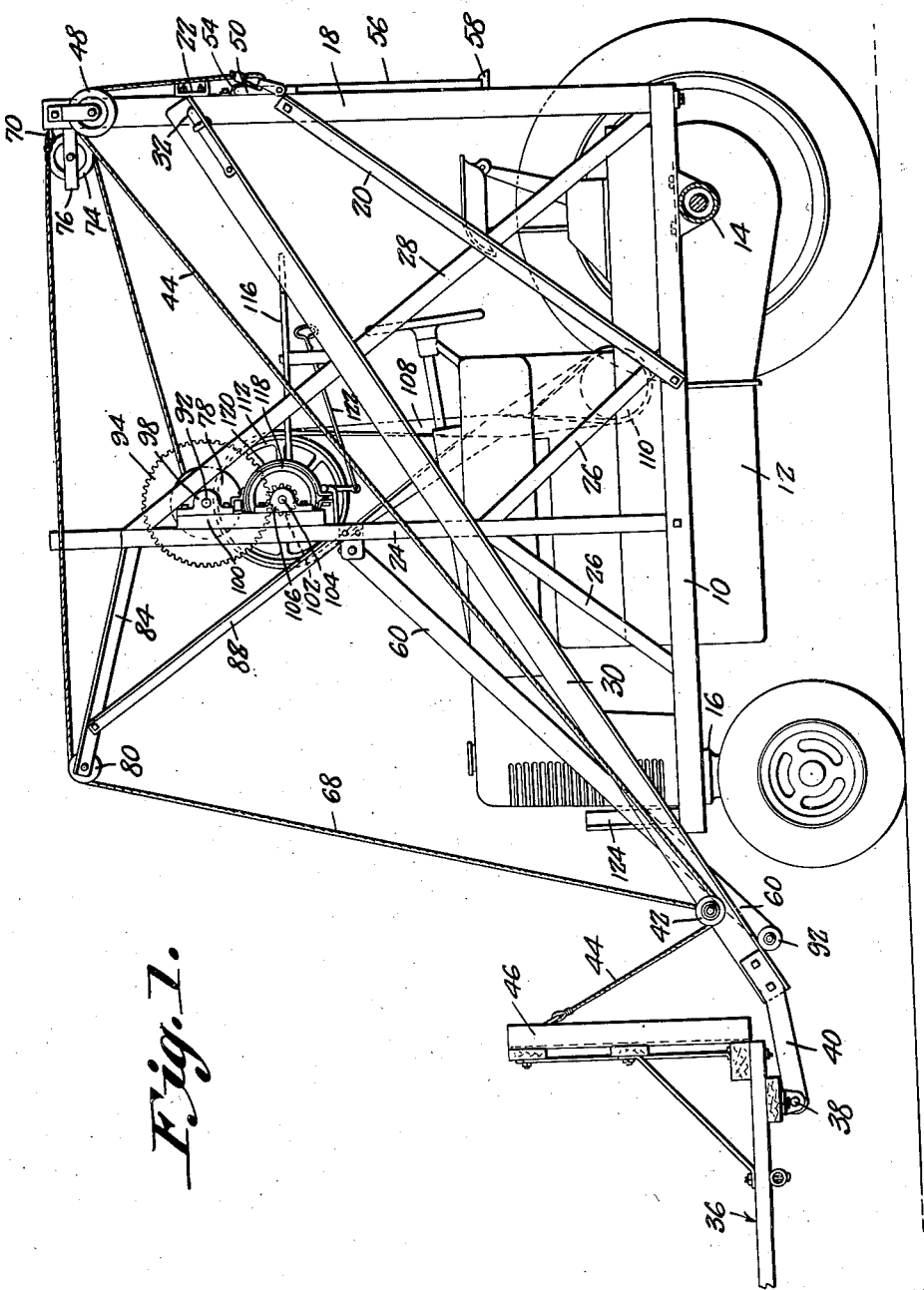
Figure 2:
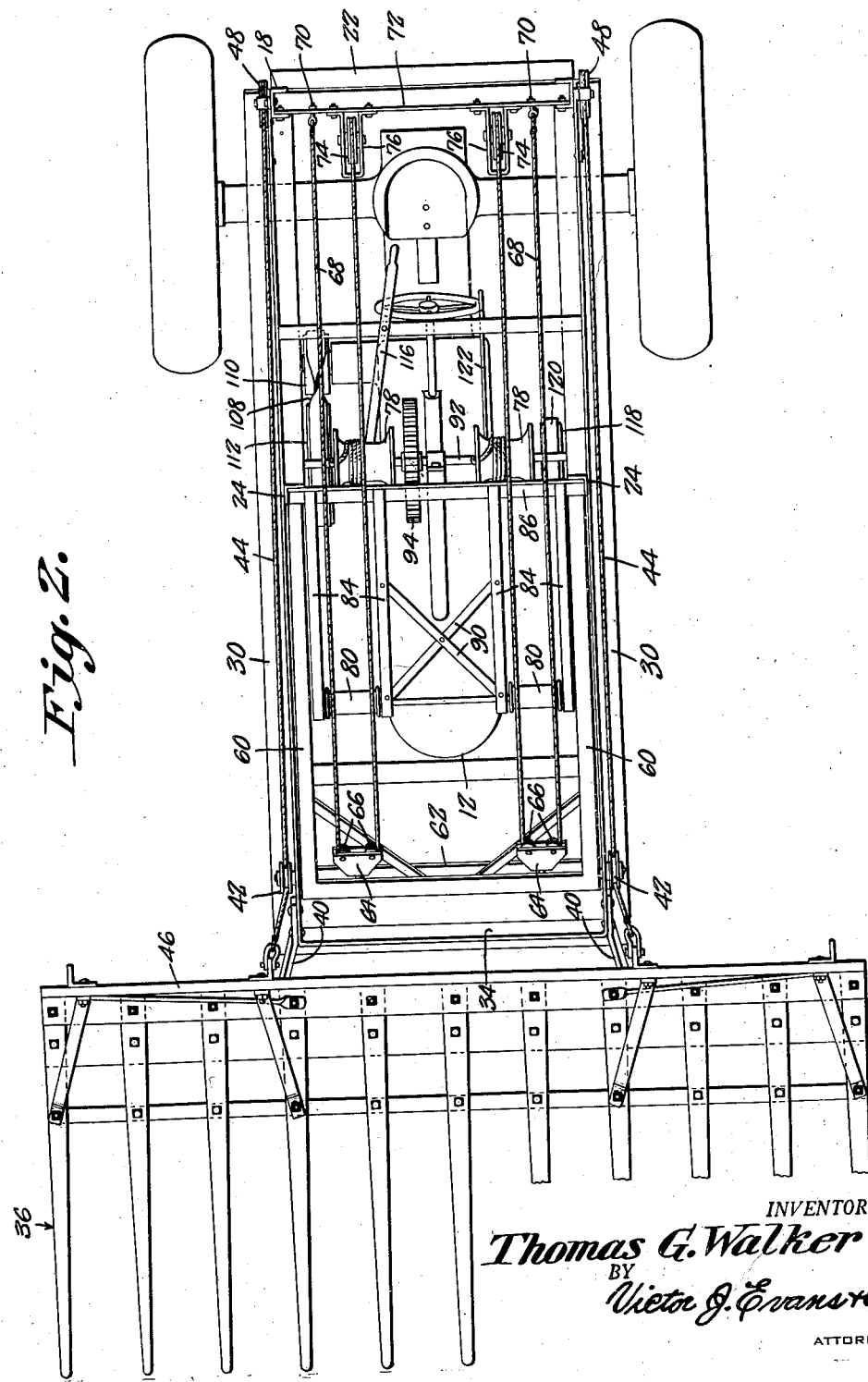
Figure 3:
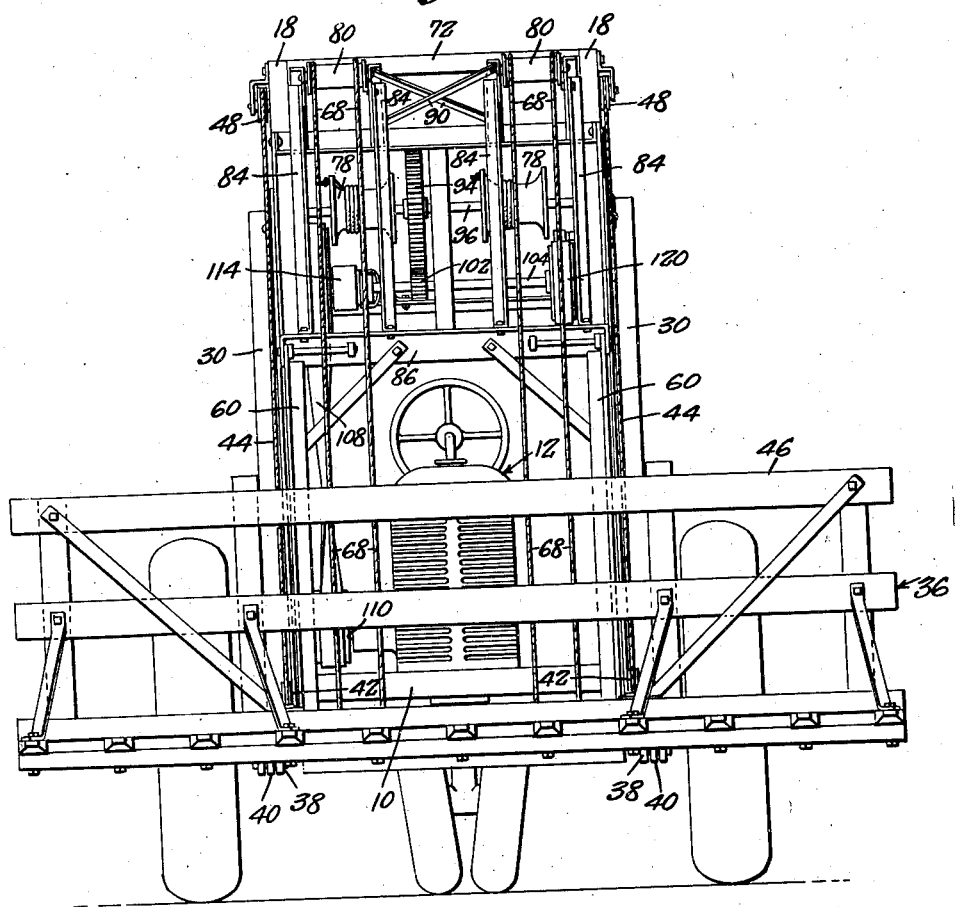
Figure 4:
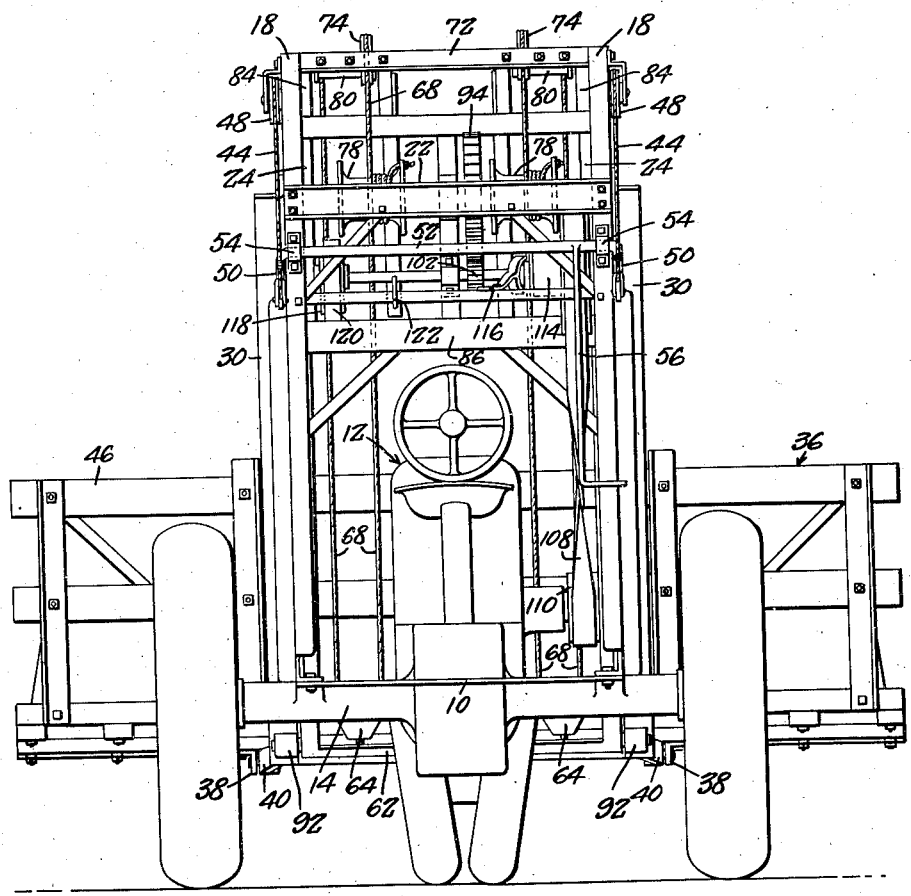

In the accompanying drawings:
Figure 1 is a side view;
Figure 2 is a top plan view;
Figure 3 is a front view;
Figure 4 is a rear view; and
Figure 5 is a side view illustrating the device in a partially elevated position.

In the embodiment selected for illustration, I make use of a frame 10 which is of rectangular contour and attached to the tractor 12. The frame may be bolted to the rear axle housing 14 and secured to the engine support 16 at the forward end of the tractor. To the rear end of the frame 10 are fixedly secured two upright channels 18 supported by angle braces 20 and additionally braced near their upper ends by a cross channel 22.

Two upright angles 24 are attached at their lower ends to the frame 10 and are located inwardly of the forward end of the frame a distance slightly less than half the length of the frame. These angles are additionally supported by diagonal braces 26 and 28.

To the channels 18 are pivotally connected the rear ends of two angles 30, as at 32, which angles are fixedly related at their forward ends by a cross angle 34. A rake unit 36 is pivotally connected at 38 with arms 40 bolted to the respective angles 30.

Grooved wheels 42 are rotatably mounted on the angles 30 for guiding lines 44 attached at their forward ends to the back structure 46 of the rake unit and extending rearwardly for passage around grooved wheels 48 rotatably mounted on the channels 18. These lines are connected with crank arms 50 attached to a shaft 52 rotatably mounted in bearings 54 on the channels 18. A lever 56 is attached to the shaft 52 and may be secured in a downwardly projecting position by a latch 58 to support the rake unit 36 against downward pivotal movement when loaded.

To the upright angles 24 are pivotally connected the rear ends of lifting angles 60 fixedly secured one to the other at their forward ends by a channel 62. Housings 64 are connected with the channel 62, and each housing is provided with two grooved wheels 66. Two lines 68 are respectively passed about the two groups of wheels 66, and each line is connected at 70 with an angle 72 secured to the channels 18. The second runs of the lines 68 pass around grooved wheels 74 supported in brackets 76 attached to the angles 72 and pass downwardly and forwardly for respective connection with drums 78. The lines 68 are supported forwardly of the uprights 24 by flanged rollers 80 supported on a shaft 82 carried at the forward ends of angles 84 attached to a cross angle 86 secured to the angles 24. Brace angles 88 and 90 are provided for the angles 84.

Rollers 92 are carried at the forward ends of the angles 60 and engage underneath the respective angles 30 to raise and lower the rake-carrying arm comprising the two angles 30 and their interconnecting angle 34. Means for rotating the drums 78 comprises a large gear 94 secured to a shaft 96 to which the drums are fixedly secured. This shaft is rotatably supported in bearings 98 attached to supports 100 secured to the upright angles 24. This gear meshes with a pinion 102 attached to a shaft 104 rotatably supported in bearings 106 attached to the support 100.

A belt 108 passes around the tractor pulley 110 and around a pulley 112 rotatably mounted on the shaft 104 and adapted for driving connection therewith through the medium of a clutch 114 actuated by a lever 116. A brake drum 118 is attached to the shaft 104 for coaction with a brake band 120 actuated by a lever control 122.

In operation, the rake-carrying arm is elevated through the medium of the lifting arm comprising the angles 60 and their connecting channel 62. Clockwise pivotal movement of the lifting arm, when viewing Figure 5, causes the wheels 92 to roll on the angles 30 for elevating the rake. Such elevation is attained through adjustment of the clutch 114 for connecting the drive pulley 112 with the shaft 104, which drives the drums 78 through the medium of the pinion 102 and the large gear 94.

The rake-carrying arm may be elevated to an exceptionally high position by reason of the arrangement of the lifting arm. The supporting frame structure and the brake-carrying arm and the lifting arm are formed of angles or channels so as to be capable of supporting heavier loads, in addition to providing a sturdy structure. All the controls are located within easy reach of the operator of the tractor.

In lieu of the rake unit 36, scrapers and the like may be attached to the arms 40.

While I have illustrated the perfected form of my invention, it is to be understood that the foregoing description is for illustrative purposes only, and I do not desire to be limited by any of the details shown or described, except as defined in the appended claims.

I claim:

1. In a device of the type described, the combination of a vehicle, a work arm means pivotally mounted at one end of said vehicle, a lift arm of shorter length than said work arm means pivotally mounted at one end on said vehicle forwardly of the axis of said work arm means and engaging the latter to raise and lower the same, means for imparting pivotal motion to said lift arm for pivoting the work arm means, said last mentioned means including pull lines connected with the forward end of said lift arm and passing around guide wheels to a position rearwardly and upwardly of the tractor and forwardly thereof, drums connected with the pull lines, a power take-off on said tractor, a driving connection between said power take-off and said drums, brake means for said drums, and clutch means for connecting and disconnecting the operating connection with respect to said drums.

2. In a device of the type described, the combination of a vehicle, a support mounted on the vehicle including upstanding channel and angle frame members, a work arm means pivotally mounted on the support at one end of said vehicle, said work arm means comprising angle members fixedly related one to the other, a lift arm of shorter length than said work arm means pivotally mounted at one end of said vehicle forwardly of the axis of said work arm means and engaging the latter to raise and lower the same, said lift arm comprising angles fixedly related one to the other, and means for imparting pivotal motion to said lift arm for pivoting the work arm means.

3. In a device of the type described, the combination of a vehicle, a support mounted on the vehicle including upstanding channel and angle frame members, a rectangular work arm means, comprising parallel side rails and a transverse cross rail of angle iron and fixedly related to each other, a rectangular left arm of shorter length than said work arm means and pivotally mounted at one end of said vehicle forwardly of the axis of said work arm means, rollers carried by the left arm and engaging underneath said work arm means and riding on the side rails thereof to raise and lower the work arm means, said left arm means comprising parallel side rails and a transverse end rail of angle irons fixedly related to each other, and means for imparting pivotal motion to said left arm for pivoting the work arm means.

THOMAS G. WALKER.